United States Patent
Sengupta et al.

(10) Patent No.: US 12,020,004 B1
(45) Date of Patent: Jun. 25, 2024

(54) SYSTEMS AND METHODS TO GENERATE HUMAN-READABLE INSTRUCTION CODE BASED ON A DECLARATIVE SPECIFICATION

(71) Applicant: EYGS LLP, London (GB)

(72) Inventors: Dipanjan Sengupta, West Bengal (IN); Samriddha Chatterjee, West Bengal (IN); Pijush Kanti Giri, West Bengal (IN)

( * ) Notice: Subject to any disclaimer, the term of this patent is extended or adjusted under 35 U.S.C. 154(b) by 0 days.

(21) Appl. No.: 18/446,238

(22) Filed: Aug. 8, 2023

(51) Int. Cl.
G06F 8/30 (2018.01)
G06F 8/35 (2018.01)

(52) U.S. Cl.
CPC ..................................... G06F 8/35 (2013.01)

(58) Field of Classification Search
CPC ..... G06F 8/10; G06F 8/30; G06F 8/31; G06F 8/425; G06F 8/427; G06F 8/436; G06F 8/447
See application file for complete search history.

(56) References Cited

U.S. PATENT DOCUMENTS

| | | | |
|---|---|---|---|
| 7,503,032 B2 | 3/2009 | Bhaskaran et al. | |
| 7,917,890 B2 | 3/2011 | Barcellona | |
| 7,975,256 B2 | 7/2011 | Atkin et al. | |
| 8,132,153 B2 | 3/2012 | Subramanyam | |
| 8,266,066 B1 | 9/2012 | Wezter et al. | |
| 8,392,997 B2 | 3/2013 | Chen et al. | |
| 8,473,519 B1 | 6/2013 | Siddiqui et al. | |
| 8,819,546 B2 | 8/2014 | Balmelli | |
| 9,521,209 B2 | 12/2016 | Lovisa et al. | |
| 9,800,644 B2 | 10/2017 | Ben Jemâa | |
| 10,083,481 B2 | 9/2018 | Futch et al. | |
| 2002/0194039 A1 | 12/2002 | Bhaskaran et al. | |
| 2004/0015832 A1* | 1/2004 | Stapp | G06F 8/30 717/149 |

(Continued)

FOREIGN PATENT DOCUMENTS

| | | |
|---|---|---|
| AU | 2005245983 A1 | 12/2005 |
| AU | 2005245983 B2 | 7/2011 |

(Continued)

OTHER PUBLICATIONS

A. F. Iosif-Lazar et al., "Experiences from Designing and Validating a Software Modernization Transformation (E)," 2015 30th IEEE/ACM International Conference on Automated Software Engineering (ASE), Lincoln, NE, USA, 2015, pp. 597-607, doi: 10.1109/ASE.2015.84. (Year: 2016).*

(Continued)

Primary Examiner — Hanh Thi-Minh Bui
(74) Attorney, Agent, or Firm — COOLEY LLP

(57) ABSTRACT

A method according to an embodiment includes receiving, via a processor, (1) first data representing one or more coding requirements defined by a user, (2) an indication of one or more target computer programming languages, and (3) a first machine-readable code. The method also includes modifying the first machine-readable code to generate a second machine-readable code based, at least in part, on the first data. The method also includes generating target machine-readable code based, at least in part, on the one or more target computer programming languages and the second machine-readable code.

20 Claims, 7 Drawing Sheets

(56) References Cited

U.S. PATENT DOCUMENTS

| | | | |
|---|---|---|---|
| 2005/0223413 A1* | 10/2005 | Duggan | G06F 21/6236 726/3 |
| 2006/0005177 A1 | 1/2006 | Atkin et al. | |
| 2006/0161444 A1 | 7/2006 | Lubrecht et al. | |
| 2006/0161879 A1 | 7/2006 | Lubrecht et al. | |
| 2006/0224630 A1 | 10/2006 | Balmelli | |
| 2007/0016889 A1* | 1/2007 | Miyazaki | G06F 8/24 717/106 |
| 2007/0169199 A1 | 7/2007 | Quinnell et al. | |
| 2007/0192236 A1 | 8/2007 | Futch et al. | |
| 2008/0127040 A1 | 5/2008 | Barcellona | |
| 2008/0282228 A1 | 11/2008 | Subramanyam | |
| 2009/0077666 A1 | 3/2009 | Chen et al. | |
| 2014/0380270 A1 | 12/2014 | Lovisa et al. | |
| 2016/0042068 A1 | 2/2016 | Ben Jemâa | |
| 2022/0206759 A1* | 6/2022 | Samuel | G06F 8/10 |

FOREIGN PATENT DOCUMENTS

| | | |
|---|---|---|
| CN | 104361539 A | 2/2015 |
| CN | 110058846 A | 7/2019 |
| CN | 111625230 A | 9/2020 |
| CN | 113935871 A | 1/2022 |
| EP | 0709773 A1 | 5/1996 |
| EP | 0709773 B1 | 3/2002 |
| EP | 1565813 A1 | 8/2005 |
| EP | 1756706 A1 | 2/2007 |
| EP | 1565813 A4 | 6/2009 |
| EP | 1756706 A4 | 6/2009 |
| EP | 1565813 B1 | 1/2019 |
| EP | 1756706 B1 | 9/2019 |
| KR | 20160103856 A | 9/2016 |
| WO | WO-03093960 A2 | 11/2003 |
| WO | WO-03093960 A8 | 5/2004 |
| WO | WO-03093960 A9 | 6/2005 |
| WO | WO-2006094330 A1 | 9/2006 |
| WO | WO-2006094330 A8 | 2/2007 |

OTHER PUBLICATIONS

Galizia, A. et al., "Json-GUI—A module for the dynamic generation of form-based web interfaces," SoftwareX, Jan.-Jun. 2019, vol. 9, pp. 28-34.

Harrand, N. et al., "Thing ML: A Language and Code Generation Framework for Heterogeneous Targets," Models '16: Proceedings of the ACM/IEEE 19th International Conference on Model Driven Engineering Languages and Systems, Oct. 2, 2016, pp. 125-135.

Lichtenhaler, Robin, "Model-driven software migration towards fine-grained cloud architectures," CEUR Workshop Proceedings, 2019, vol. 2339, 4 pages.

\* cited by examiner

SYSTEMS AND METHODS TO GENERATE HUMAN-READABLE INSTRUCTION CODE BASED ON A DECLARATIVE SPECIFICATION

FIELD

The embodiments described herein relate to systems and computerized methods for code generation based on a user-defined declarative specification.

BACKGROUND

A user can have rules that govern the generation of source code. As such, it can be desirable to have systems configured to generate source code that complies with user-defined rules.

SUMMARY

In an embodiment, a method includes receiving, at a compute device, one or more programming design rules. The method also includes generating, via the compute device, (1) a machine-readable declarative specification including the one or more programming design rules, and (2) machine-readable code that complies with the one or more programming design rules included in the machine-readable declarative specification.

DETAILED DESCRIPTION

Figure 1:
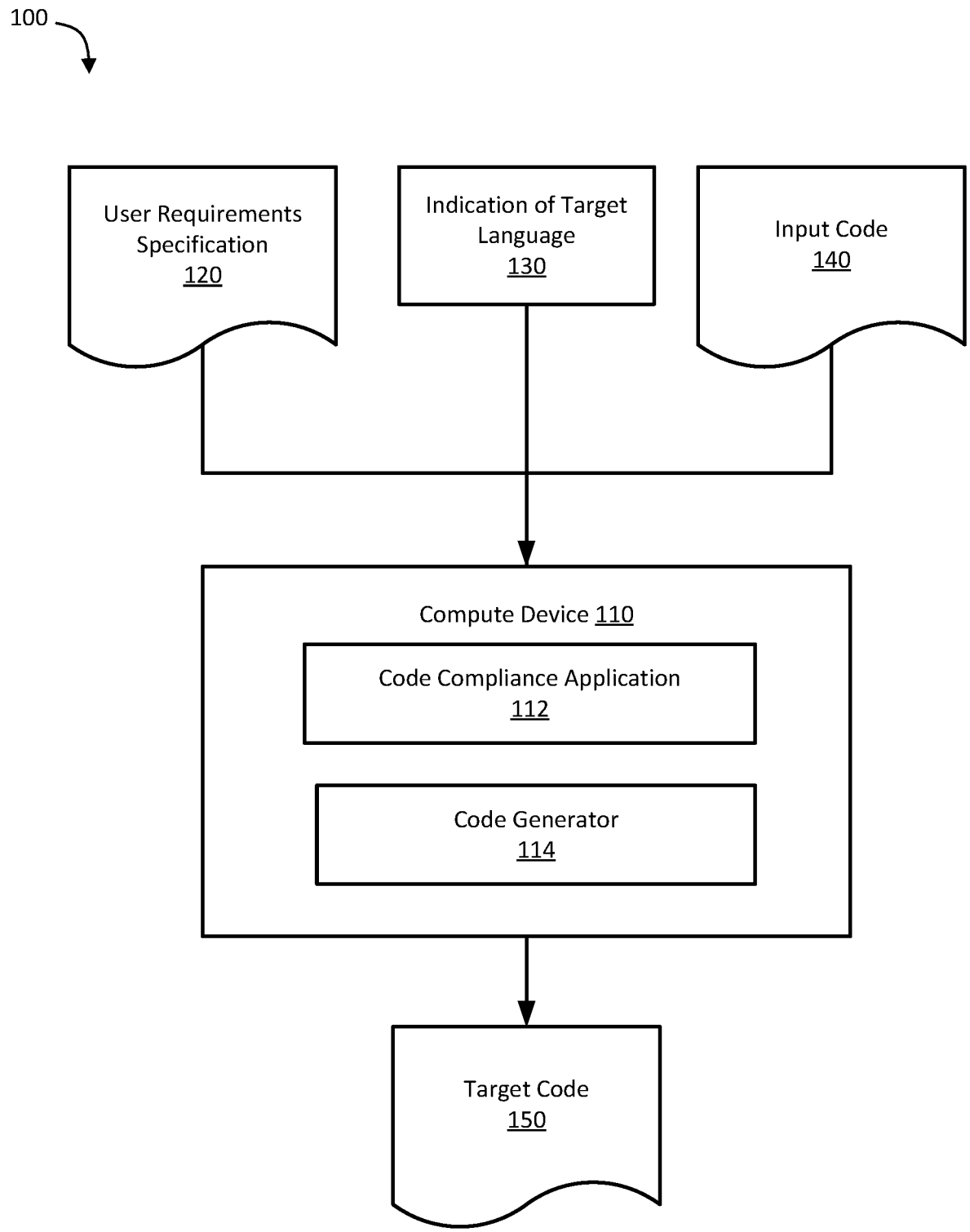
FIG. 1 is a schematic diagram of a code generation system, according to an embodiment.

FIG. 1 is a schematic diagram of a code generation system 100, also referred to herein as "a system," for generating programming code that complies with user-defined requirements, according to an embodiment. The code generation system 100 includes a compute device 110 that receives a plurality of inputs from a user. In some instances, these inputs can include, for example, a user requirements specification 120, a target language indication 130, and input code 140. In some implementations, based on these inputs, the compute device 110 can include a code compliance application 112 and/or a code generator 114, such that the compute device 110 is configured to cause the generation of target code 150.

The compute device 110 can include, for example, a hardware-based computing device, a multimedia device, or a cloud-based device such as, for example, a computer device, a server, a desktop compute device, a laptop, a smartphone, a tablet, a wearable device, a remote computing infrastructure, and/or the like. In some implementations, the compute device 110 can be configured to execute (e.g., via a processor) the code compliance application 112 to modify the input code 140 such that the modified code complies with requirements that are specified in the user requirements specification 120, as described herein. In some implementations, the compute device 110 can be further configured to execute (e.g., via the processor) the code generator 114 to generate the target code 150 based on the modified code that results from the code compliance application 112, as described herein. In some implementations, although not shown in FIG. 1, the compute device 110 can be configured to execute (via a first processor) the code compliance application 112 and an additional compute device (not shown in FIG. 1) can be configured to execute the code generator 114, wherein the compute device 110 is configured to send the modified code to the additional compute device to be used as an input to the code generator 114.

As described herein, the code generator 114 can be configured to generate target code (e.g., the target code 150) that is associated with, for example a cloud-native application. The target code 150 can be human-readable instruction data. A cloud-native application can include, for example, computer software that natively uses services and/or infrastructure from cloud computing providers. Cloud computing can include, for example, delivery of computing services (e.g., servers, storage, databases, networking, software, analytics, intelligence, and/or the like) over the internet. A cloud-native application can include a plurality of code bases that includes, for example, an application code base, an infrastructure-as-code base, and/or a deployment artifact, as described herein.

The user requirements specification 120 can include, for example, a file (e.g., a digital document) that includes data represented by machine-readable code. The data can include, for example, indications of at least one of a coding requirement, a programming design rule, a constraint, and/or the like, to be applied to executable programming code. In some implementations, the user requirements specification 120 can codify a set of user-defined best practices and/or standards. Such best practices and/or standards can be associated with, for example, syntactic and semantic styles for a particular programming language, guidelines to optimize memory utilization and/or execution time (i.e., guidelines to optimize time complexity and/or space complexity), techniques for improving cloud-native application stability (e.g., techniques associated with cyclometric complexity), and/or guidelines for preventing or reducing security vulnerabilities such as, for example, SQL injection, cross-site scripting, code injection, and/or vulnerabilities associated with broken and/or risky cryptographic algorithms.

In some implementations, the user requirements specification 120 can define, via machine-readable code, software architecture design patterns and/or software architecture design principles. These patterns and/or principles can be associated with, for example, cloud-native application development. In some implementations, examples of these patterns and/or principles can include best practices for cloud-native applications exposed as software-as-a-service, where these best practices can be associated with, for example, segregation of codebases, dependency management, externalization of configurations, backing service-based integration, isolation of build, release and run stages, isolation of stateless processes, dynamic port binding capability, automatic scalability, fast startup, graceful shutdown, streaming log aggregation, authentication strategies, and/or authorization strategies. In some implementations, these best practices can be further associated with API-first design principles and/or adaptation of open telemetry. In some implementations, the user requirements specification 120 can define, via machine-readable code, a modularization strategy for cloud-native applications. In some implementations, the user requirements specification 120 can define, via machine-readable code, rules associated with non-repetition of code snippets.

In some implementations, the user requirements specification 120 can codify, via machine-readable code, a plurality of principles associated with object-oriented and agile design and that are configured to improve agility, flexibility, and maintainability of cloud-native application architectures. This plurality of principles can include, for example, (1) a single responsibility principle that is associated with segregation of responsibility, (2) an open-closed principle that is associated with extensions to entities without modifying a source, (3) a Liskov substitution principle that is associated with a function using objects of derived classes without explicit declaration, (4) an interface segregation principle associated with client-specific interfaces, and/or (5) a dependency inversion principle associated with an abstraction-based control of dependency between high module(s) and low module(s). In some implementations, the user requirements specification 120 can codify, via machine-readable code, a standard associated with pipeline-based continuous integration and continuous deployment (CI-CD) for a cloud-native application. In some implementations, the user requirements specification 120 can codify, via machine-readable code, infrastructure provisioning best practice(s) associated with infrastructure-as-code frameworks and/or config-as-code frameworks, where the infrastructure-as-code frameworks can be configured for managing and/or provisioning computer data centers through machine-readable definition files, and where the config-as-code frameworks can be configured for configuring provisioned infrastructure resources (e.g., configuring a server with requested applications or configuring a firewall device).

In some implementations, the user requirements specification 120 can include machine-readable code that is associated with organization-specific best practices. These organization-specific best practices can be defined, for example, by an organization that includes a user of the compute device 110. In some implementations, the organization can include one more users that define at least a portion of the user requirements specification 120. The organization-specific best practices can be associated with, for example, architecture, DevOps, application development, and/or usage of reusable components. The organization-specific best practices can include, for example, a reusable framework that encapsulates organization-specific common behaviors for application development, a naming convention for source code artifacts, a restriction on usage of third-party libraries, and/or a reusable software-defined infrastructure module.

In some implementations, the user requirements specification 120 can include one or more declarative specifications that codify at least one of a standard, principle, pattern, requirement, rule, constraint, and/or best practice. In some implementations, the user requirements specification 120 can be used, via the compute device 110, to generate, for example, infrastructure code, application code, and/or deployment artifacts, that comply with the standard, principle, pattern, requirement, rule, constraint, and/or best practice, as described herein.

The target language indication 130 can include a user-provided input that indicates a programming language associated with the target code 150. In some implementations, the target language indication 130 can indicate a programming language that is different from the input code 140. The target language indication 130 can indicate a programming language that includes, for example, a system of notation (i.e., a standardized programming language) for writing computer programs. In some implementations, these systems of notation can be configured for writing programs associated with cloud-native applications and/or infrastructure-as-code. Such systems of notation can include, for example, JavaScript, Node.js, Python, C, C++, GoLang, Java, NET, PUP, Ruby, Ruby on Rails, ASP.NET, C#, F#, Visual Basic, and/or the like. The compute device 110 can use the target language indication 130 to generate (e.g., via a processor) an input to the code generator 114, as discussed herein.

The input code 140 can include machine-readable code that is associated with an executable program. In some implementations, the input code 140 can implement at least a portion of the executable program. For example, the input code 140 can include at least one of a deployment artifact, an application code base, or an infrastructure-as-code base, any of which can be associated with the executable program. In some implementations, the executable program can include, for example, a cloud-native application, as described herein. The input code 140 can be, for example, an executable program that is associated with a programming language that is different from the target language indication 130 that is provided by a user. For example, the input code 140 can be associated with a first programming language, and the target language indication 130 can be associated with a second programming language that includes a system of notation that is distinct from the first programming language. In some implementations, the input code 140 can be a non-executable, machine-readable, conceptual model that defines at least one input and at least one output that is to be associated with programming code (e.g., the target code 150). In some implementations, the input code 140 can include executable, machine-readable code that implements a function, method, process, and/or the like, associated with the target code 150.

In use, the compute device 110 can generate the target code 150 based on the user requirements specification 120, the target language indication 130, and the input code 140. The target code 150 can be associated with a programming language based on the target language indication 130, and the target code 150 can include a set of input(s) and a set of output(s) that are equivalent to a set of input(s) and a set of output(s) associated with the input code 140. The target code 150 can be configured to comply with a set of at least one rule, constraint, principle, best practice, and/or the like, that is defined in the user requirements specification 120, as described herein.

Figure 2:
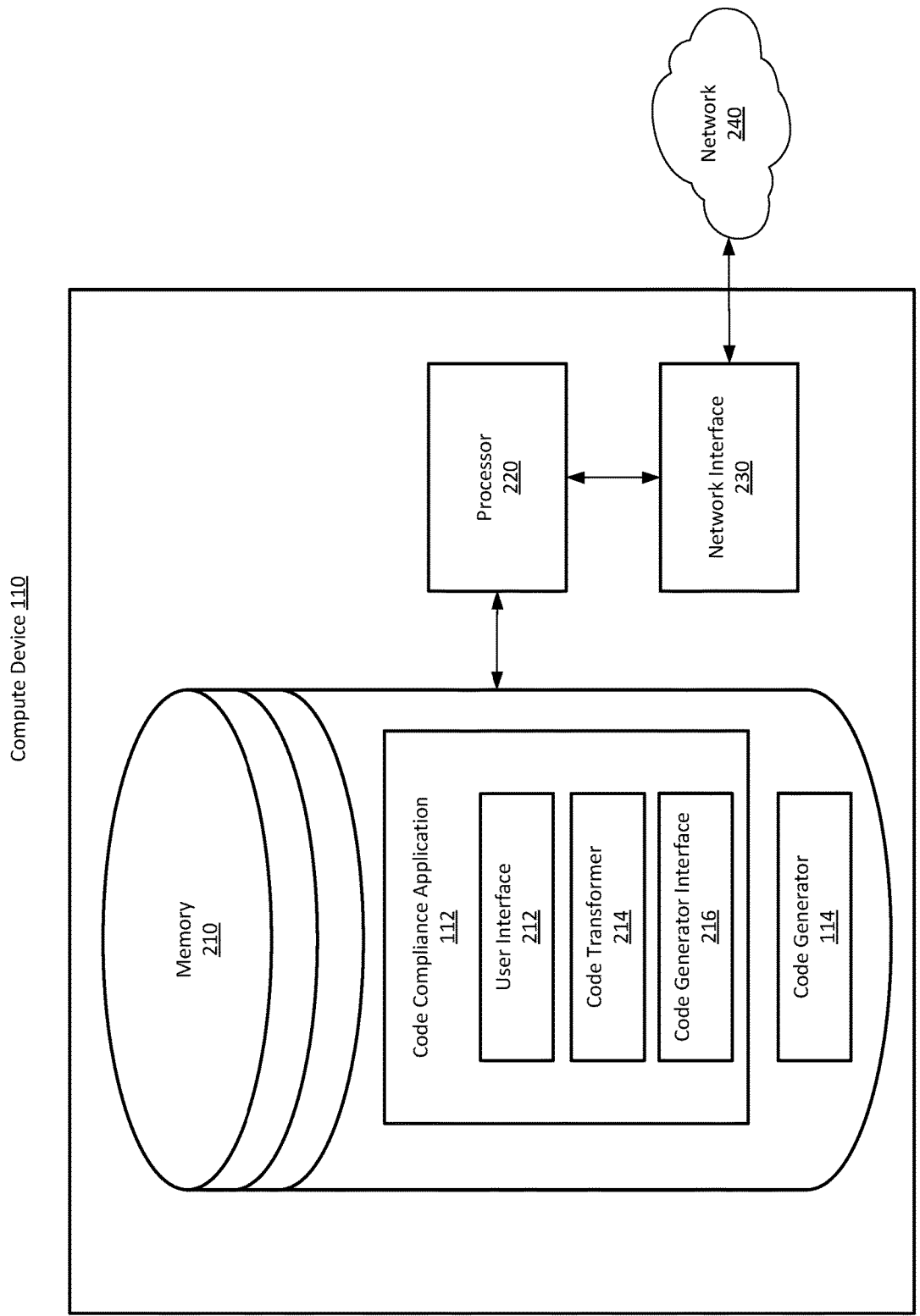
FIG. 2 is a schematic diagram of a compute device included in a code generation system, according to an embodiment.

FIG. 2 is a schematic diagram of the compute device 110 from the code generation system 100 shown in FIG. 1, according to an embodiment. The compute device 110 can be a hardware-based computing device, a multimedia device, or a cloud-based device such as, for example, a computer device, a server, a desktop compute device, a laptop, a smartphone, a tablet, a wearable device, a remote computing infrastructure, and/or the like. The compute device 110 can include a memory 210, a processor 220, and a network interface 230 configured to interface with a network 240.

The processor 220 can be, for example, a hardware based integrated circuit (IC), or any other suitable processing device configured to run and/or execute a set of instructions or code. For example, the processor 220 can be a general-purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC), a remote cluster of one or more processors associated with a cloud-based computing infrastructure and/or the like. The processor 220 is operatively coupled to the memory 210 (described herein). In some embodiments, for example, the processor 220 can be coupled to the memory 210 through a system bus (for example, address bus, data bus and/or control bus). The memory 210 can be, for example, a random-access memory (RAM), a memory buffer, a hard drive, a read-only memory (ROM), an erasable programmable read-only memory (EPROM), and/or the like. The memory 210 can store, for example, one or more software modules and/or code that can include instructions to cause the processor 220 to perform one or more processes, functions, and/or the like (e.g., those associated with the code compliance application, as described herein). In some implementations, the memory 210 can be a portable memory (e.g., a flash drive, a portable hard disk, and/or the like) that can be operatively coupled to the processor 220. In some implementations, the memory can be remotely operatively coupled with the compute device 110, for example, via the network interface 230. For example, a remote database server can be operatively coupled to the compute device 110.

In some implementations, the memory 210 can include a code compliance application 112 and a code generator 114. In some implementations, the code compliance application 112 and/or the code generator 114 can include software code stored in the memory 210 and executable by the processor 220. In some implementations, the code compliance application 112 and/or the code generator 114 can include hardware components. In some instances, although not shown in FIG. 2, the code generator 114 can be included in a memory that is operatively connected to the compute device 110 (e.g., via a network 240, as discussed herein).

The code compliance application 112 can include a user interface 212, a code transformer 214, and a code generator interface 216. The code compliance application 112 can be configured to generate input(s) that are to be used by the code generator 114 to generate code (e.g., the target code 150 of FIG. 1) that complies with one or more user requirements (e.g., user requirements defined by the user requirements specification 120), as described herein.

The user interface 212 can be configured to accept a set of inputs from a user of the compute device 110. The set of inputs can include, for example, the user requirements specification 120, the target language indication 130, and/or the input code 140, as described in relation to FIG. 1. In some instances, the user interface 212 can include, for example, a RESTful interface, a command line interface, a programmable interface, a graphical user interface (GUI), and/or the like. A RESTful interface can be associated with a representational state transfer (REST) architectural style configured to manage network-based application behavior. A RESTful interface can include, for example, an API configured to exchange data over a network (e.g., the network 240), the data including the user requirements specification 120, the target language indication 130, and/or the input code 140. In some instances, the command line interface can include, for example, an interface (e.g., a terminal, shell, and/or the like) configured to interact with the code compliance application based on text inputs from a user. In some instances, the programmable interface can include, for example an application programming interface (API) that is configured to facilitate communication between the code compliance application 112 and an external application, the external application configured to provide the user requirements specification 120, the target language indication 130, and/or the input code 140 to the code compliance application 112.

Figure 3:
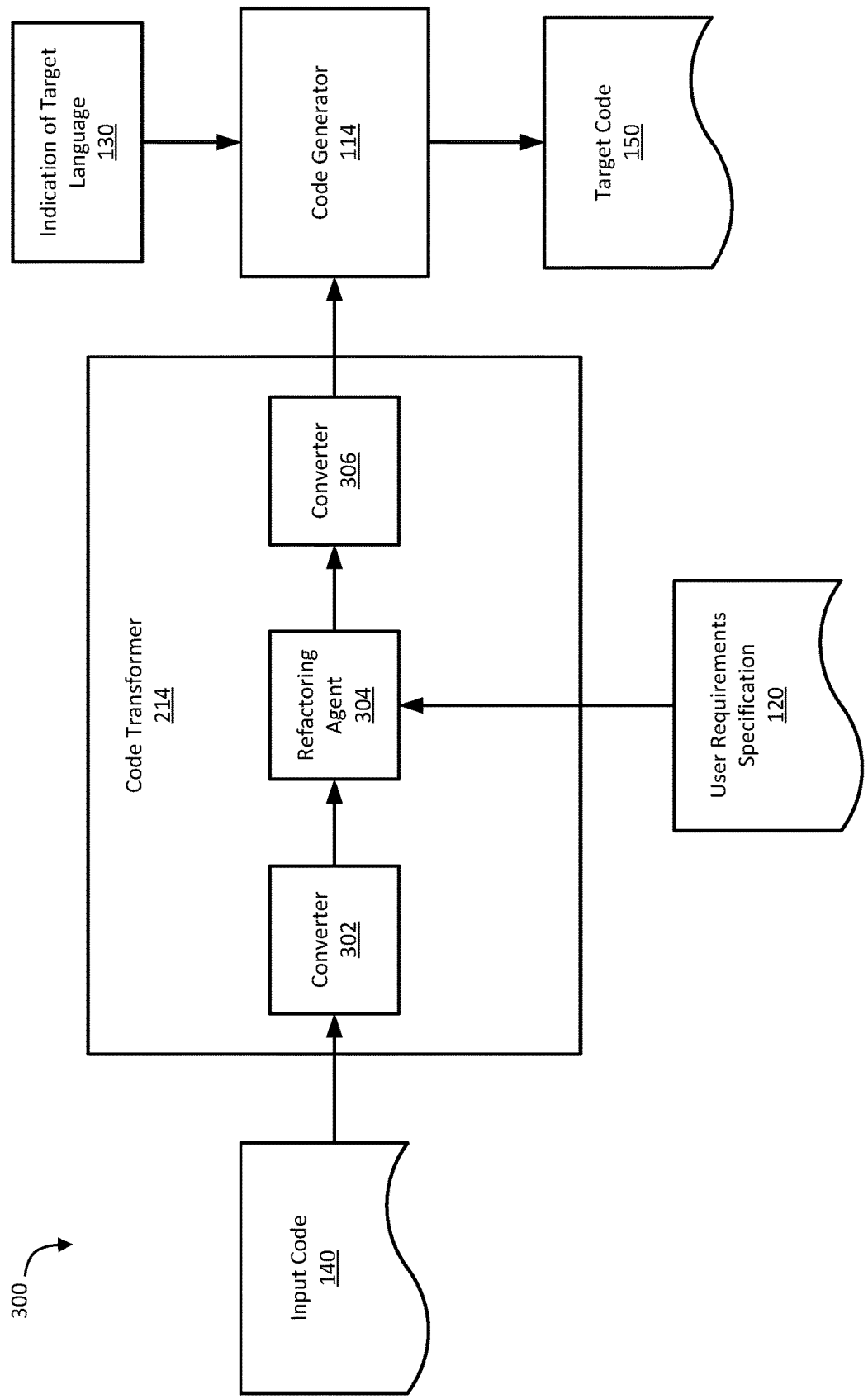
FIG. 3 is a schematic diagram of code generation components that are included in a code generation system, according to an embodiment.

The code transformer 214 can be configured to generate machine-readable code based on the user requirements specification 120 and the input code 140, as described herein in relation to FIG. 3. In some instances, input code 140 can include noncompliant code that does not comply with one or more requirements, constraints, and/or the like, defined by the user requirements specification 120. The code transformer 214 can be configured to include modified code in the generated machine-readable code and exclude the noncompliant code, the modified code configured to comply with the one or more requirements and perform an equivalent function to the noncompliant code.

The code generator interface 216 can include a RESTful interface, a command line interface, a programmable interface, and/or the like, that is configured to operatively couple the code compliance application 112 to the code generator 114. For example, in some instances, the RESTful interface can include at least one GET endpoint and/or at least one POST endpoint. The GET endpoint can be configured to, for example, retrieve a list of available configuration specifications (e.g., the user requirements specification 120, a lexical specification, a dependency specification, a dependency specification, and/or a prototype specification, as described herein). The POST endpoint can be configured to, for example, accept a JSON document, an Open API, and/or an Async API as input to generate code, as described herein. The command line interface can include a utility configured to accept text commands that indicate one or more inputs to be provided to the code generator 114 to generate code (e.g., the target code 150 of FIG. 1). Examples of the text commands that indicate the one or more inputs are shown below:

java -jar custom-artifact.jar options
    java -jar custom-artifact.jar code --data/mountpath/input.json -spec /mountpath/openapi.yml -type application -dir/mountpath/destinations The programmable interface can include, for example, a library dependency that can be leveraged by a code generator (e.g., the code generator 114). The library dependency can be associated with a programming language (e.g., Java, JavaScript, Python, and/or the like) that the code generator (e.g., the code generator 114) is configured to interpret.

In some instances, the code generator interface 216 can be configured to select a code generator from a plurality of code generators based on the target language indication 130 of FIG. 1. For example, a first code generator may be configured to generate code associated with a programming language that is represented by the target language indication 130, while a second code generator is configured to generate code that is not associated with the programming language that is represented by the target language indication 130.

The code generator 114 can include an executable application that is configured to generate computer programming code based on machine-readable input code. In some instances, the machine-readable input code can include code that is associated with a higher abstraction level than the code that is generated by the code generator 114. In some instances, the code generator 114 can be configure to convert machine readable code that is written in a first programming language to a machine readable code that is written in a second programming language.

The network interface 230 can include one or more network interface controllers. These one or more network interface controllers can be one or more I/O (i.e., input/output) devices that are configured to transfer data to and/or from the processor 220 (e.g., via one or more buses supported by the processor 220). The one or more network interface controllers can be further configured to transfer the data to and/or from a network 240 that includes, for example, the Internet, an intranet, a local area network (LAN), a wide area network (WAN), a metropolitan area network (MAN), a worldwide interoperability for microwave access network (WiMAX®), an optical fiber (or fiber optic)-based network, a Bluetooth® network, a virtual network, and/or any combination thereof. The one or more network interface controllers can be configured based on one or more network protocols, such as Ethernet, Infiniband, OC48/OC192, ATM, SONET, and 802.11. In some instances, the one or more network interface controllers 240 can be configured to support a network storage protocol, such as, for example, Internet Small Computer Systems Interface (iSCSI), Fibre Channel (FC), Fibre Channel over Ethernet (FCoE), Network File System (NFS) or Server Message Block (SMB). In some instances, the one or more network interface controllers can include, for example, a network interface card (NIC), a Wi-Fi™ module, a Bluetooth® module and/or any other suitable wired and/or wireless communication device.

In some instances, the network interface 230 can facilitate receiving and/or transmitting data, including data associated with a cloud-native application. For example, the network interface 230 can be configured to receive a series of user inputs (e.g., the user requirements specification 120, the target language indication 130, and/or the input code 140) via the user interface 212, as described herein. In some instances, although not shown in FIG. 2, the network interface 230 can be configured to send input(s) generated by the code compliance application 112 to a code generator that is stored in a memory that is operatively coupled to the compute device 110 via the network 240. The code generator interface 216 can be configured to use the network interface 230 to send the input(s), as described herein. In some instances, the network interface 230 can be configured to deploy the target code 150 of FIG. 1 to a cloud environment associated with the network 240, the target code 150 being associated with a cloud-native application.

FIG. 3 is a schematic diagram of code generation components 300, according to an embodiment. The code generation components 300 can be associated with a compute device (e.g., a compute device that is structurally and/or functionally similar to the compute device 110 of FIGS. 1 and 2). In some instances, for example, the code generation components 300 can be software stored in memory 210 and configured to execute via the processor 220 of FIG. 2. In some instances, for example, at least a portion of the code generation components 300 can be implemented in hardware. The code generation components 300 include the user requirements specification 120, the target language indication 130, the input code 140, the code transformer 214, the code generator 114, and the target code 150.

The code transformer 214 can be an executable program configured to take as inputs the input code 140 and the user requirements specification 120 to generate machine-readable code that complies with user-defined requirements and that is to be used by the code generator 114. This machine-readable code can include a set of input(s) and a set of output(s) that are equivalent to a set of input(s) and a set of output(s) associated with the input code 140. In some instances, this machine-readable code is associated with a programming language that is not equivalent to the programming language indicated by the target language indication 130. In some instances, this machine-readable code is associated with the programming language that is associated with the input code 140. The code transformer 214 can include a converter 302, a refactoring agent 304, and a converter 306.

The converter 302 can be configured to translate the input code 140 to an intermediate code. This intermediate code can be associated with, for example, a data structure that represents the structure of the input code 140. For example, the converter 304 can be configured to convert the input code 140 to a JSON format that represents syntax associated with the programming language of the input code 140 and invoked by the input code 140. In some instances, this data structure can include a hierarchal data structure, such as, for example, a syntax tree, a concrete syntax tree, an abstract syntax tree, a parse tree, and/or the like. In some instances, the data structure can include a symbol table. The data structure can include, for example, variable names, constants, procedure names, function names, literal constants, literal strings, comments, labels, and/or the like.

The converter 302 can include, for example, a lexical analyzer and a parser. The lexical analyzer can be configured to generate one or more tokens (i.e., string(s) and/or sequence(s) of characters) based on text included in the input code 140. In some instances, these one or more tokens can represent a meaning associated with the text, the meaning being based on the programming language associated with the input code 140. For example, the lexical analyzer can generate a keyword token based on the text "for" being included in the input code 140, and/or the lexical analyzer can generate an operator token based on the text "+" being included in the input code 140. If, for example, the input code 140 includes the text "3+2," the lexical analyzer can generate a literal token "3," an operator token "+," and a literal token "2," based on the text included in the input code 140. Said differently, the lexical analyzer can be configured to classify portions of the text included in the input code 140.

The parser can be configured to contextualize the token(s) identified by the lexical analyzer. In some instances, the parser can be configured to generate the data structure (e.g., a syntax tree) based on the tokens generated by the lexical analyzer. The parser can reference a set of rules associated with the programming language of the input code 140 to determine components (e.g., expressions) of the input code 140 based on an ordered sequence of tokens generated by the lexical analyzer. For example, the parser can be configured to identify an if-condition-then statement and represent that statement with at least one branch and at least one node of a syntax tree.

The refactoring agent 304 can be configured to traverse the data structure (e.g., a hierarchical data structure) to determine whether the syntactic structure and/or semantics of the input code 140 complies with syntactic rule(s) and/or semantic rule(s) included in the user requirements specification 120. In some instances, the syntactic rule(s) and/or the semantic rule(s) can be included in a lexical specification that is included in the user requirements specification 120, as described herein. In some instances, a lexical constraint (e.g., the lexical constraint 402 of FIG. 4) can include the syntactic rule(s) and/or the semantic rule(s). In some instances, a syntactic rule can include, for example, a constraint associated with a naming convention, as described herein. In some instances, a semantic constraint can include, for example, a constraint that requires code (e.g., the target code 150) to (1) exclude wild pointers (e.g., a pointer that does not point to an object or a valid type of object), (2) exclude code that is reliant on weak data typing (e.g., implicit type conversion), (3) exclude code that operates jointly on a plurality of semantics (e.g., inches and centimeters) assigned to the same type (e.g., an integer), exclude an encryption method (e.g., a type of hash function) associated with known security vulnerabilities, and/or the like. In some instances, a semantic constraint can include a constraint that requires a type of algorithm (e.g., a merge sort algorithm) to be included in the target code 150 to solve a problem (e.g., sorting) instead of other types of algorithms configured to solve the same problem (e.g., bubble sort, selection sort, insertion sort, and/or the like). The semantic constraint can require and/or prefer a type of algorithm to, for example, improve the time complexity, the space complexity, and/or the like, associated with the target code 150.

The refactoring agent 304 can be configured to generate a modified data structure (e.g., a syntax tree) based on the data structure generated by the converter 302. In some instances, the modified data structure can be represented in JSON format and/or the like. The modified data structure can include representations of code that comply with user requirements that are included in the user requirements specification 120. For example, based on non-compliant code that is included in the input code 140 and parsed by the converter 302, the refactoring agent 304 can identify the parsed portion of the input code 140 that is noncompliant. The refactoring agent 304 can be configured to alter at least one of a syntactic property and/or a semantic property of the input code 140 that is represented by the data structure generated by the converter 302. In some instances, the refactoring agent 304 can be configured to parse the user requirements specification 120 to generate a data structure, and compare that resulting data structure to the data structure generated by the converter 302 to identify an expression, statement, and/or the like, that fails to comply with the user requirement(s) included in the user requirements specification 120. In some instances, the refactoring agent 304 can be further configured to identify a remedial modification to the data structure generated by the converter 302 based on the parsing of the user requirements specification 120. For example, if a user-defined requirement included in the user requirements specification 120 indicates (e.g., via a regular expression, as described herein) that all final variables in the target code 150 are to have associated names that include uppercase character(s), and if the input code 140 includes a final variable associated with a name that does not include uppercase characters, the refactoring agent 304 can determine from the data structure generated by the converter 302 that said final variable name does not comply with the user-defined rule. The refactoring agent 304 can be further configured to modify the data structure associated with said final variable, such that the resulting modified data structure includes a representation of the modified final variable name that includes uppercase character(s).

The converter 306 can be configured to translate the modified data structure generated by the refactoring agent 304 to machine readable code that is associated with a programming language. In some instances, this programming language can be equivalent to the programming language of the input code 140 and/or not equivalent to the target code 150 to be generated. The converter 306 can generate code that complies with user requirement(s) included in the user requirements specification 120. This code can be associated with a programming language that the code generator 114 is configured to accept as input and translate, based on the target language indication 130, to generate the target code 150.

Figure 4:
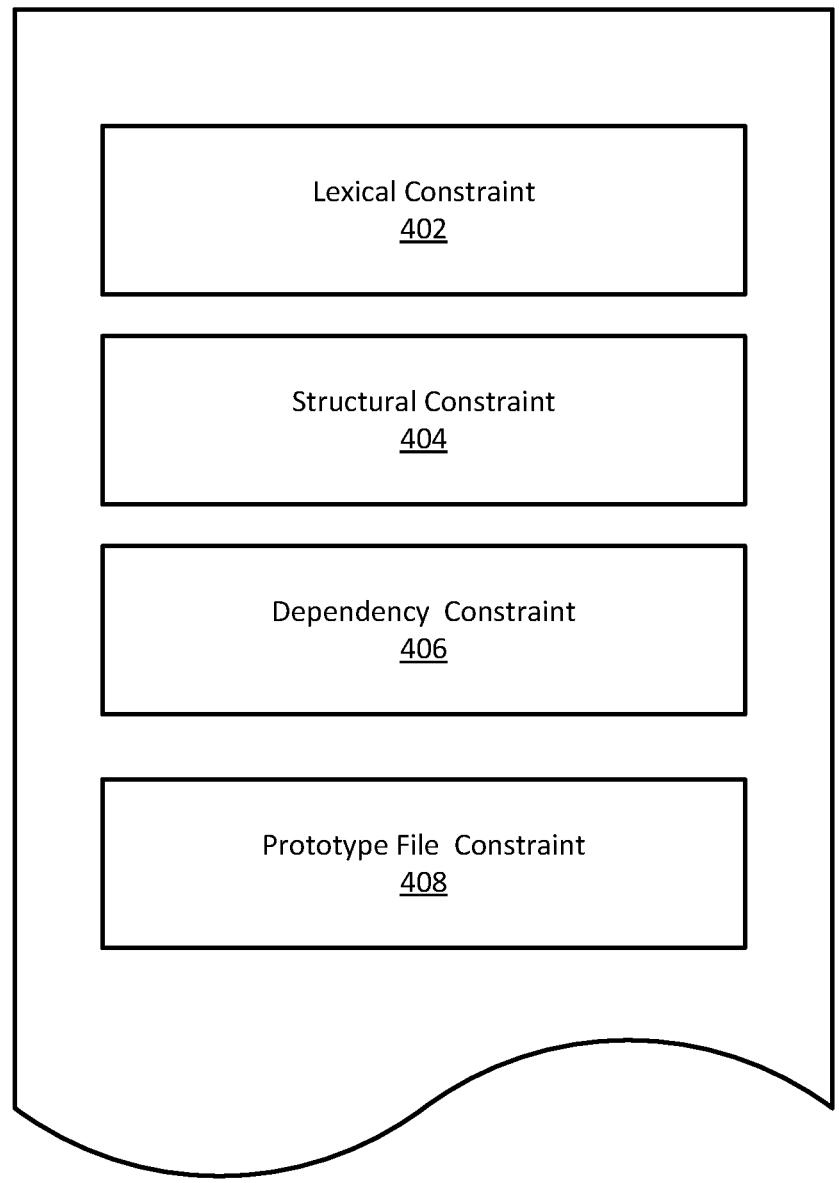
FIG. 4 is a schematic diagram of a user requirements specification that is associated with a code generation system, according to an embodiment.

FIG. 4 is a schematic diagram of the user requirements specification 120 from the code generation system 100 shown in FIG. 1, according to an embodiment. As described herein, the user requirements specification 120 can include one or more declarative specifications that codify at least one of a standard, principle, pattern, requirement, rule, constraint, and/or best practice. In some instances, the user requirements specification 120 can be used, via the compute device 110, to generate, for example, infrastructure code, application code, and/or deployment artifacts, that comply with the standard, principle, pattern, requirement, rule, constraint, and/or best practice, as described herein. The user requirements specification 120 includes a lexical constraint 402, a structural constraint 404, a dependency constraint 406, or a prototype constraint 408. Each of these specifications can include a set of rules and/or configuration parameters to be applied to executable code (e.g., the target code 150), as described herein. For example, the lexical constraint 402 can define, via machine-readable code, a programming language-specific syntactic rule and/or a programming language-specific semantic construction rule. In some instances, a syntactic rule can be associated with a style guide and can include, for example, a restriction on one or more symbols, punctuations, words, and/or combinations thereof, to be enforced within executable code (e.g., the target code 150). In some instances, a semantic rule can include, for example, a restriction on a sequence of one or more string characters that is to be included in executable code (e.g., the target code 150) and that can be associated with an ambiguous computational meaning based on a compiler that receives the executable code.

In some instance, a syntactic rule can include, for example, a constraint associated with a naming convention. The naming convention can restrict, for example, one or more string characters that appear in a word (e.g., a sequence of string characters) that is to be included in executable code (e.g., the target code 150). For example, the code block below illustrates two example syntactic rules that are associated with respective naming conventions. The code block may be included in, for example, the lexical constraint 402 that is included in the user requirements specification 120. As illustrated in the example code block, the first syntactic rule has a rule identifier of "X-CUST-0001" and applies to any string associated with a final variable that is to be included in java code (which can be included in, for example, target code 150). This first syntactic rule constrains all names given to final variables that are to be included in the java code to have an initial character that is in uppercase. This first syntactic rule defines a pattern that includes acceptable characters (e.g., the first letter of a final variable name is to include any string character with associated an ASCII code that is between, inclusively, the ASCII code for "A" and the ASCII code for "Z"). In some instances, as shown in the example code block, the pattern of acceptable characters that is associated with the syntactic constraint can be defined using a regular expression (i.e., regex).

The second syntactic rule, illustrated for example purposes in the example code block below, has a rule identifier of "X-CUST-0002" and applies to any string associated with a private variable that is to be included in the java code. This second syntactic rule constrains all names given to private variables that include a compound word of one or more sub-words and are to be included in the java code to have an initial character of an initial sub-word from the one or more sub-words that is a lowercase character. This second syntactic rule further constrains remaining sub-words from the one or more sub-words are to have an initial character that is an uppercase character. Said differently, the second syntactic rule specifies that all private variables names to be included in the java code are to be in lower camel case. This second syntactic rule is specified, like the first syntactic rule, using a regular expression.

```
language: java
version: 11
rules:
imports:
  -./language/google.java.yml
  -./language/sun.java.yml
custom:
  -id: X-CUST-0001
   name: uppercase_final_declaration
   description: All final variables should be in uppercase
   rule:
     type: object
     properties:
       fieldDeclaration:
         type: object
         properties:
           fileModifier:
             type: string
             const: final
           identifier:
             type: string
             pattern: "/^[A-Z]*"
  -id: X-CUST-0002
   name: lowercase_private_declaration
   description: All private variables should be in lower camel case
   rule:
     type: object
     properties:
       fieldDeclaration:
         type: object
         properties:
           fileModifier:
             type: string
             const: private
           identifier:
             type: string
             pattern: "/^[a-z]*[A-Z]*"
```

In addition to the two syntactic rules show in the example code block above, a syntactic rule associated with an organization and/or user specified naming convention can include, for example, a rule that requires names of variables, parameters, functions, objects, methods, and/or the like to be formatted in accordance to at least one of camel case, pascal case (i.e., upper camel case), snake case, kebab case, and/or the like.

The structural constraint 404 can define, via machine-readable code, one or more structural rules to be applied to the target code 150. These one or more structural rules can be associated with, for example, a structure of a project (e.g., packages to be included) associated with the target code 150, a modularization strategy associated with a design principle (as discussed above), an interface provision that requires a client to include one or more backing services (e.g., an interface segregation principle), an abstract class that controls a dependency between a high-level module and a low-level module, a segregation of a codebase associated with the target code 150, an integration associated with a backing service, a deployment configuration for isolation of build, a re-release, and/or a run stage. In some instances, the structural constraint 404 can include machine-readable code that is formatted according to, for example, the XML format. For example, the structural constraint 404 can include the following example code block that is configured to define a directory structure (i.e., a folder structure) associated with to-be-generated code (e.g., the target code 150). This example code block defines sub-directories within a "src" directory, the sub-directories including "main" and "test," "main" including the sub-sub-directories "java" and "resources," "resources" including the sub-sub-sub-directory "deployment," and "test" including the sub-sub-directories "java" and "resources."

```
<fileSets>
  <fileSet>
    <directory>src/main/java</directory>
  </fileSet>
  <fileSet>
    <directory>src/main/ resources</directory>
  </fileSet>
  <fileSet>
    <directory>src/main/resources/deployment</directory>
  </fileSet>
  <fileSet>
    <directory>src/test/java</directory>
  </fileSet>
  <fileSet>
    <directory>src/test/resources</directory>
  </fileSet>
</fileSets>
```

In some instances, the structural constraint 404 can include, for example, the following example code block that defines a package hierarchy of the to-be-generated code (e.g., the target code 150). This example code block includes a metadata descriptor associated with a package and a class included in that package. A package can be used to group related classes and can, for example, prevent name conflicts in the target code 150.

```
<packages>
  <package generator-method = "template" regenerate = "true">
    <properties>
      <property key="_packageName_"
        value="${_packageName_(.data_model["group.id"],
        .data_model["artifact.id"])+".controller"}"/>
      <property key="className_"
        value=="${_className_(.data_model["artifact.id"])}
        />
    </properties>
    <templates>
      <template>application/springboot/java/modules/controller/
        _classNamePlaceHolder_Controller.java.ftl</template>
      >
    </templates>
  </package>
  . . .
</packages>
```

In some instances, the structural constraint 404 can include, for example, the following example code block that defines an interface declaration of backing services associated with the to-be-generated code (e.g., the target code 150). A backing service can include, for example, a service that a cloud-native application consumes over a network. The declarative interface can be configured to implement these backing services based on an organization's and/or user's requirements. The following code block illustrates an example for implementing a backing service, the backing service being associated with at least one class and at least one package.

```
<package id="backing-service-interface" generator-method="java"
  bean="databaseBackingServiceHelperinterfaceGenerator"
  regenerate="true">
  <properties>
    <property key="serviceId"
      value="$(service["id")}"/>
    <property key="classNamePrefix"
      value="${classNamePrefix(service["logical-name"],"",
        .data_model["caseConvertor"])+"Service"}"/>
    <property key="classNameSuffix"
      value="Helper"/>
    <property key="rootPackageName"
      value="${packageName(.data_model["linked-profile"]
        ["groupId"], "", .data_model["artifactId"]) + ". " +
        convertToPkgName (service [ "logical-name"] ) +
        ".helper"}"/>
    <property key="rootPackageName"
      value="${packageName(.data_model["linked-profile"]
        ["groupId"], "", .data_model["artifactId"])}"/>
    <property key="basePackageName"
      value="${packageName(.data_model["linked-profile"]
        ["groupId"], "", .data_model["artifactId"])}"/>
    <property key="modelPackageName"
      value="${packageName(.data_model["linked-profile"]
        ["groupId"], "", .data_model["artifactId"])}"/>
  </properties>
  <templates>
    < template>application/springboot/java/module/api/helper
      /backing-service/database/IclassNamePrefix_Helper.java.mf
  </ templates>
</package>
```

In some instances, the dependency specification can define, via machine-readable code, one or more library dependencies that are permitted based on an organization's and/or user's requirements. In some instances, the dependency specification can define these library dependencies using an artifact (as discussed herein) that includes, for example, a bill of materials. In some instances, a library dependency can be associated with an externalization of one or more configurations, where an application code is configured for use in one or more environments (e.g., development, test, quality assurance, production, and/or the like). The library dependencies can include, for example, one or more files that store configuration data that can include database internet protocol (IP) addresses, passwords, connection strings for backing services, flags that define the flow of functions within code associated with the one or more files, and/or a logging level. In some instances, these one or more files, once generated (e.g., by the code generator 114, discussed herein) can be stored in an external store to be loaded by a cloud-native application during runtime. The configuration data can vary depending on the environment that the application is executed in, and the cloud-native application can access this configuration data in any environment associated with the one or more files. In some instances, the dependency constraint 406 can define, through machine-readable code, one or more dependencies associated with streaming log aggregation (e.g., a log 4j2 library, a Winston library, and/or the like). In some instances, the dependency constraint 406 can define, through machine-readable code, one or more dependencies associated with open telemetry (e.g., a Spring cloud starter sleuth external dependency). In some instances, the dependency constraint 406 can define, through machine-readable code, one or more dependencies associated with authorization and/or authentication (e.g., a Spring framework security module). In some instances, the dependency constraint 406 can define, through machine-readable code, one or more dependencies associated with prevention of security vulnerabilities (e.g., a Spring security framework).

For example, the dependency constraint 406 can include the example code block below that is configured to define a plurality of dependencies (e.g., dependencies associated with (1) "spring-boot-starter-web," (2) "spring-boot-starter-actuator," (3) "spring-boot-starter-aop," and (4) "spring-boot-starter-test").

```
language: java
version:: 11
dependents:
  framework:
    org.springframework.boot:spring-boot-starter-web
    org.springframework.boot:spring-boot-starter-actuator
    org.springframework.boot:spring-boot-starter-aop
    org.springframework.boot:spring-boot-starter-test dis-
      covery:
    org.springframework.cloud:spring-cloud-starter-kuber-
      netes-client-all circuit-breaker:
    io.github.resilience4j:resilience4j-spring-boot2
    io.github.resilience4j:resilience4j-circuitbreaker
    io.github.resilience4j:resilience4j-bulkhead
    io.github.resilience4j:resilience4j-retry
```

In some instances, the user requirements specification 120 can include, for example, the prototype constraint 408 that enforces an organization's and/or user's requirements by defining a set of prototype files configured to generate artifacts that comply with those requirements. An artifact can include, for example, a file produced by a build that can be reused in another build, another job of the build, a deployment pipeline, and/or a release pipeline. In some instances, an artifact can include a software package, a library, a zip file, and/or any other type of file used for deploying applications (e.g., a cloud-native application). In some instances, the target code 150 can include code that is associated with an artifact. The example code block illustrates an example of the prototype constraint 408 configured to generate an artifact for a cloud-native application.

```
public class ${_className_} {
/**
*
*/
${lib.requestMapping(.data model, operation)}
@ApiOperation(value = "${operation["summary"]!""}",
response= ${lib.apiResponseType(.data_model, operation["responses"])})
@ApiResponses({ ${lib.apiResponses(operation["responses"])} })
public ResponseEntity<${lib.getServiceReturnType(.data_model,
operation["responses"])}>
  ${lib.toLowerCamelFromUpperCamel(operation["operationid"],
    .data_model["caseConvertor"])}
  (
    ${lib.getApiParameter(.data_model, operation,
      operation["parameters"]![ ])}
  );
}
```

The example code block illustrates an example of the prototype constraint 408 configured to generate an artifact associated with infrastructure-as-code.

```
data "template file" "inventory" {
  template = "${file("${path.module}/templates/inventory.ini.tpl") }"
  depends_on = [
```

```
  openstack_compute_floatingip_associate_v2.kube-master-fip-attachment,
  openstack_compute_floatingip_associate_v2.etcd-fip-attachment,
  openstack_compute_floatingip_associate_v2.kube-node-fip-attachment
]
vars = {
  master_ips = openstack_networking_floatingip_v2.kube-master-
    ip.*.address,
  etcd_ips = openstack_networking_floatingip_v2.etcd.*.address,
  worker_ips = openstack_networking_floatingip_v2.kube-node.*.address
  }
}
resource "null_resource" "inventory-hosts" {
  depends_on = [
    data.template_file.inventory
  ]
  provisioner "local-exec" {
    command= "echo '${data.template_file.inventory.rendered}'>
      ansible. hosts.ini"
  }
}
```

Figure 5:
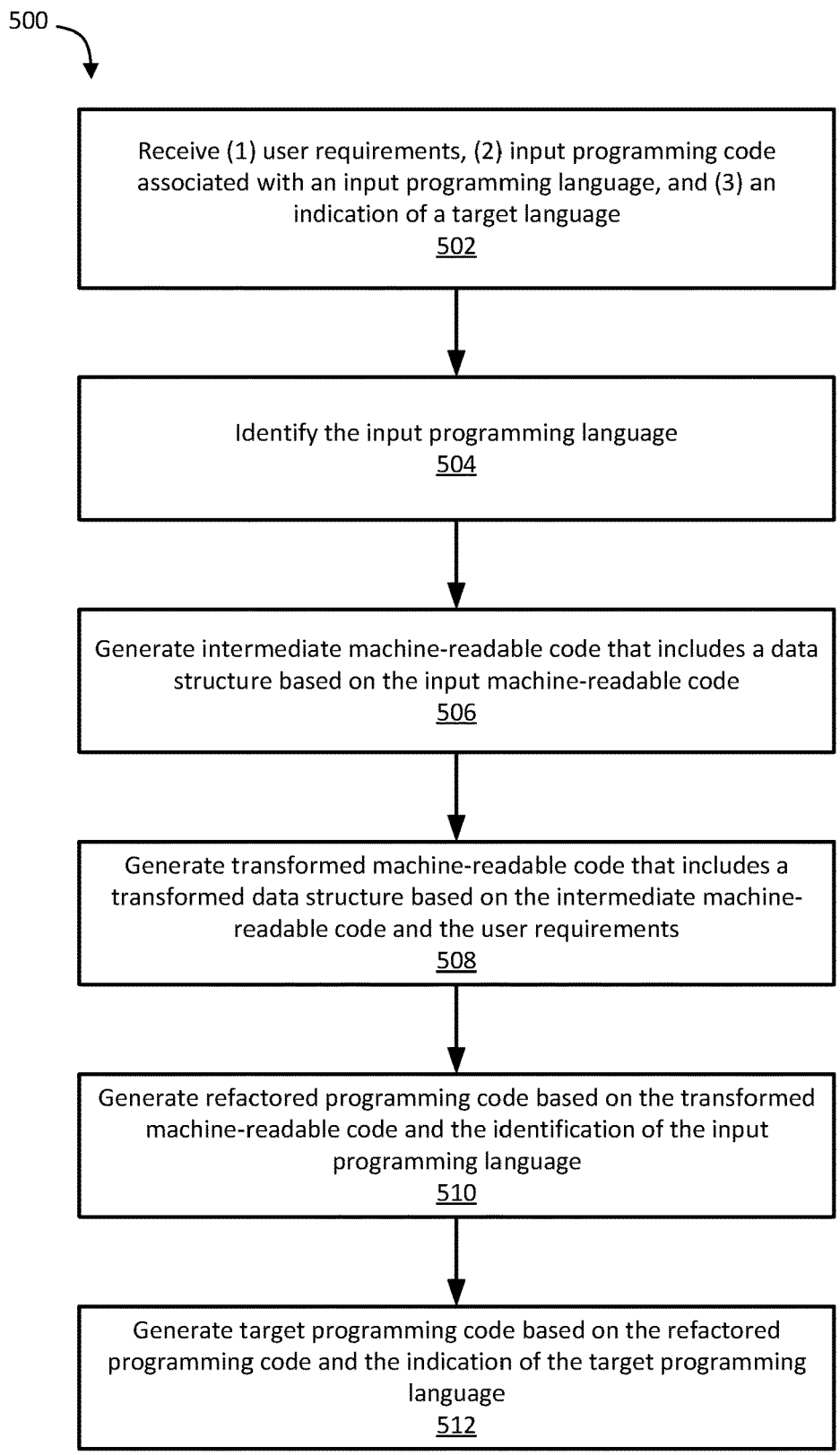
FIG. 5 is a flowchart showing a method of using a code generation system to generate programming code, according to an embodiment.

FIG. 5 is a flowchart showing a method 500 illustrating an example implementation using a code generation system, according to an embodiment. The method 500 can be implemented by a code generation system described herein (e.g., the code generation system 100 of FIG. 1). Portions of the method 500 can be implemented using a processor (e.g., the processor 220 of FIG. 2) of any suitable compute device (e.g., the compute device 110 of FIG. 1). The method 500 can include a method of generating machine-readable code that complies with user requirement(s).

The method 500 at 502 includes receiving user requirements (e.g., user requirements included in the user requirements specification 120 of FIG. 1), input programming code associated with an input programming language (e.g., the input code 140 of FIG. 1), and an indication of a target language (e.g., the target language indication 130 of FIG. 1). In some instances, the user requirements, and/or the input programming code, the indication can be received from a user via a RESTful interface, a command line interface, a programmable interface, a graphical user interface (GUI), and/or the like, as described herein.

The method 500 at 504 includes identifying the input programming language. The input programming language can be the programming language associated with the input code (e.g., the input code 140 of FIG. 1). In some instances, the identifying can be based on an indication provided by the user (e.g., via a RESTful interface, a command line interface, a programmable interface, a graphical user interface (GUI), and/or the like, as described herein). In some instances, the identifying can be performed automatically (i.e., without human intervention) by a parser, a lexical analyzer, a transformer model, and/or the like. In some instances, the identifying can be based on sequence(s) of character(s) that are unique to or indicative of the programming language.

The method 500 at 506 includes generating intermediate machine-readable code associated with a data structure based on the input programming code. In some instances, the converter 302 of FIG. 3 included in the code transformer 214 of FIG. 2 can be used to generate the machine-code automatically (i.e., without human intervention), as described herein. In some instances, the machine-readable code can be formatted according to a JSON format, an XML format, or any other format suitable for representing data. The generating can be further based on the input programming language identified at 504, wherein a converter (e.g., the converter 302 of FIG. 3) to perform the generating is selected from a plurality of converters based on the input programming language. In some instances, this data structure can include a hierarchal data structure, such as, for example, a syntax tree, a concrete syntax tree, an abstract syntax tree, a parse tree, and/or the like, as described herein. This data structure can include syntax included in the input programming code, as described herein.

The method 500 at 508 includes generating transformed machine-readable code that includes a transformed data structure based on the intermediate machine-readable code and the user requirements. In some instances, the refactoring agent 304 of FIG. 3 included in the code transformer 214 of FIG. 2 can be used to generate the transformed machine-readable code automatically (i.e., without human intervention), based on the data structure generated by the converter 302, as described herein. In some instances, the transformed machine-readable code can be formatted according to a JSON format, an XML format, and/or the like. The transformed machine-readable code can include a data structure that represents programming code that complies with user requirements that are included in a user requirements specification (e.g., the user requirements specification 120 of FIG. 1). For example, based on non-compliant code that is included in the input machine readable code (e.g., the input code 140 of FIG. 1) received at 502, a refactoring agent (e.g., the refactoring agent 304 of FIG. 3) can identify portion(s) of the input programming code that are noncompliant. The refactoring agent can be configured to generate a data structure that includes alterations to those portions of the input programming code, such that those portions comply with the user requirements.

The method 500 at 510 includes generating refactored programming code based on the transformed machine-readable code and the identification of the input programming language. The refactored programming code can be associated with the input programming language, such that the programming language of the input programming code is equivalent to the programming language of the refactored programming code. The refactored programming code can include a set of input(s) and a set of output(s) that are equivalent to a set of input(s) and a set of output(s) associated with the input programming code. The refactored programming code can be further configured to comply with a set of at least one rule, constraint, principle, best practice, and/or the like, that is defined in the user requirements specification (e.g., the user requirements specification 120 of FIG. 1), as described herein. The generating can be performed automatically (i.e., without human intervention) via, for example, the converter 306 of FIG. 3, as described herein.

The method 500 at 512 includes generating target programming code (e.g., the target code 150 of FIG. 1) based on the refactored programming code and the indication of the target programming language (e.g., the target language indication 130 of FIG. 1). A code generator (e.g., the code generator 114 of FIG. 2) can be used to perform the generating, as described herein. The indication of the target programming language can be unassociated with the input programming language identified at 504. The target programming code can include a set of input(s) and a set of output(s) that are equivalent to the set of input(s) and a set of output(s) associated with the input programming code and the set of input(s) and a set of output(s) associated with the refactored programming code. In some instances, the target programming code is associated with a cloud-native application, as described herein In some implementations, the generating can be performed automatically via a RESTful interface between, for example, the code transformer 214 of FIG. 2 and the code generator 114.

Figure 6:
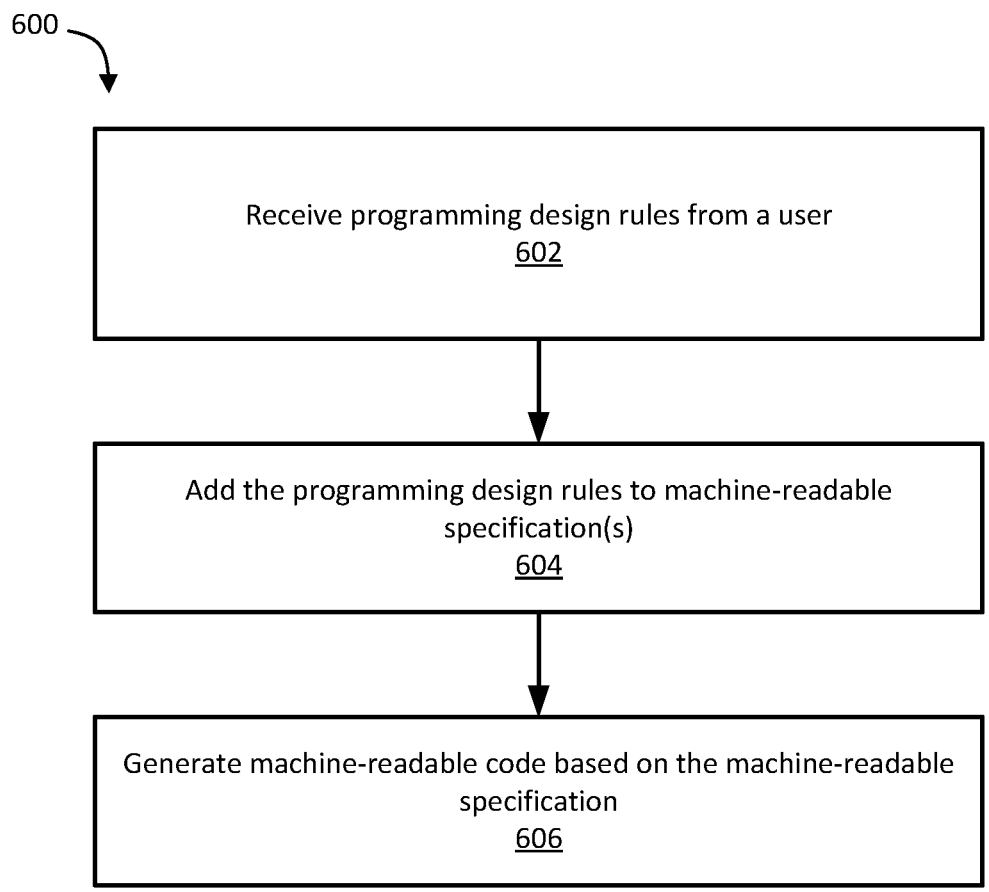
FIG. 6 is a flowchart showing a method of using a code generation system to generate programming code, according to an embodiment.

FIG. 6 is a flowchart showing a method 600 illustrating an example implementation using a code generation system, according to an embodiment. The method 600 can be implemented by a code generation system described herein (e.g., the code generation system 100 of FIG. 1). Portions of the method 600 can be implemented using a processor (e.g., the processor 220 of FIG. 2) of any suitable compute device (e.g., the compute device 110 of FIG. 1). The method 600 can include a method of generating machine-readable code that complies with user requirement(s).

The method 600 at 602 includes receiving programming design rules from a user. The programming design rules can be associated with, for example, cloud-native application development. The programming design rules can enforce, for example, syntactic and semantic coding styles, optimized use of memory and/or processing resources (e.g., algorithm selection to optimize time complexity and/or space complexity), the use of techniques for improving cloud-native application stability (e.g., techniques associated with cyclometric complexity), and/or the use of code designs that reduce security vulnerabilities such as, for example, SQL injection, cross-site scripting, code injection, and/or vulnerabilities associated with broken and/or risky cryptographic algorithms. The programming design rules can include at least one of a lexical constraint (e.g., the lexical constraint 402 of FIG. 4), a structural constraint (e.g., the structural constraint 404 of FIG. 4), a dependency constraint (e.g., the dependency constraint 406 of FIG. 4), and/or a prototype file constraint (e.g., the prototype file constraint 408 of FIG. 4). In some instances, the programming design rules can be included in machine-readable code that is received via user interface (e.g., a RESTful interface, a command line interface, a programmable interface, a graphical user interface (GUI), and/or the like).

The method 600 at 604 includes adding the programming design rules to machine-readable specification(s). The machine-readable specification(s) can include the user requirements specification 120 of FIG. 1, which, as described herein, can include a lexical specification, a dependency specification, a dependency specification, and/or a prototype specification. In some instances, the programming design rules can be translated before they are added to the machine-readable specification(s), the translation being performed by a translator, parser, a lexical analyzer, a transformer machine-learning model, a compiler, and/or the like. In some implementations, the adding can be performed automatically (i.e., without human intervention).

The method 600 at 606 includes generating machine-readable code based on the machine-readable specification. In some instances, the generating can be performed by a code generator (e.g., the code generator 114 of FIG. 1) automatically (i.e., without human intervention), as described herein. The generating can be based on, for example, input machine-readable code (e.g., the input code 140 of FIG. 1), wherein the generated machine-readable code is to perform a function that is equivalent to a function of the input machine-readable code. In some instances, the generating can be based on a user-defined indication of a programming language, such that the generated machine-readable code is associated with that programming language, as described herein.

Figure 7:
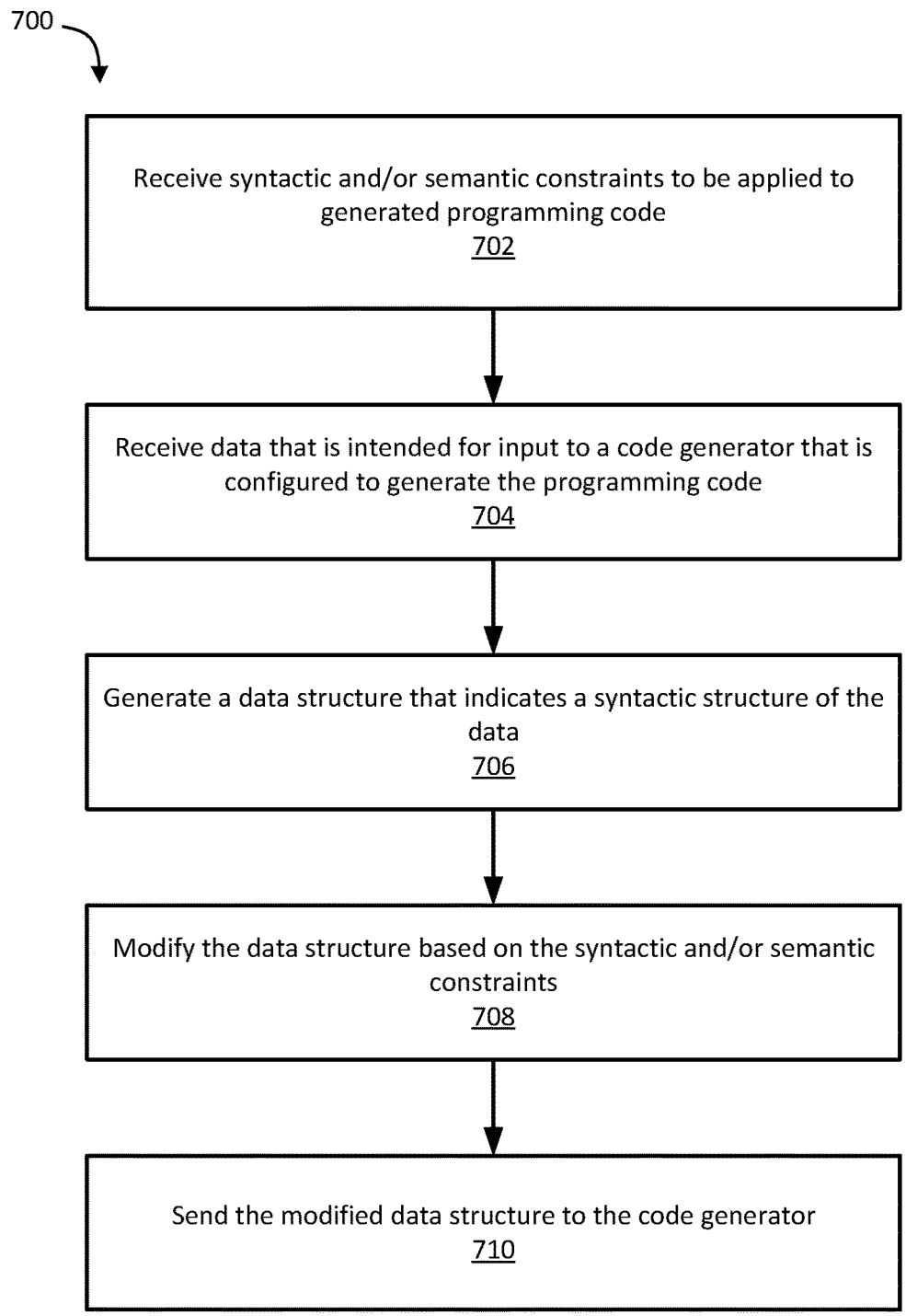
FIG. 7 is a flowchart showing a method of using a code generation system to generate programming code, according to an embodiment.

FIG. 7 is a flowchart showing a method 700 illustrating an example implementation using a code generation system, according to an embodiment. The method 700 can be implemented by a code generation system described herein (e.g., the code generation system 100 of FIG. 1). Portions of the method 700 can be implemented using a processor (e.g., the processor 220 of FIG. 2) of any suitable compute device (e.g., the compute device 110 of FIG. 1). The method 700 can include a method of generating machine-readable code that complies with user requirement(s).

The method 700 at 702 includes receiving syntactic and/or semantic constraints to be applied to generated programming code. A syntactic constraint can be associated with, for example, a style guide and can include, for example, a restriction on one or more symbols, punctuations, words, and/or combinations thereof, as described herein. For example, a syntactic constraint can include a naming convention. A semantic constraint can include, for example, a constraint that requires code (e.g., the target code 150 of FIG. 1) to (1) exclude wild pointers (e.g., a pointer that does not point to an object or a valid type of object), (2) exclude code that is reliant on weak data typing (e.g., implicit type conversion), (3) exclude code that operates jointly on a plurality of semantics assigned to the same type, exclude an encryption method associated with known security vulnerabilities, and/or the like. In some instances, a semantic constraint can include a constraint that prefers an algorithm from a plurality of algorithms, wherein the plurality of algorithms are configured to solve a problem, and the algorithm is associated with improved time complexity, space complexity, and/or the like, relative to the remaining algorithm(s) from the plurality of algorithms. The syntactic and/or semantic constraints can be included in, for example, one or more user requirements specifications (e.g., the user requirements specification 120 of FIG. 1).

The method 700 at 704 includes receiving data that is intended for input to a code generator that is configured to generate the programming code. The data can include input programming code (e.g., the input code 140 of FIG. 1) and/or an indication of a programming language (e.g., the target language indication 130 of FIG. 1) associated with code (e.g., the target code 150 of FIG. 1) to be generated by a code generator (e.g., the code generator 114 of FIG. 1), as described herein.

The method 700 at 706 includes generating a data structure that indicates a syntactic structure of the data. In some implementations, the converter 302 included in the code transformer 214 can generate the data, as described in relation to FIG. 3. In some implementations, the data structure can include a hierarchal data structure (e.g., a syntax tree) that represents a structure of at least a portion of the data (e.g., the input code 140) received at 704, as described herein. The generating can be performed automatically (i.e., without human intervention) via, for example, the converter 302 of FIG. 3, as described herein.

The method 700 at 708 includes modifying the data structure based on the syntactic and/or semantic constraints. In some implementations, the refactoring agent 304 of the code transformer 214 can modify the data structure. The modifying can include, for example, a replacement of one or more symbols included in the data structure, the one or more symbols arranged in violation of at least one of the syntactic and/or semantic constraints received at 702. In some implementations, the modifying can include generating a modified data structure (e.g., a modified syntax tree), as described herein. The modified data structure can include a representation of programming code that complies with the syntactic and/or semantic constraints. The modifying can be performed automatically (i.e., without human intervention) via, for example, the refactoring agent 304 of FIG. 3, as described herein.

The method 700 at 710 includes sending the modified data structure to the code generator. In some implementations, although not shown in, for example, FIG. 3, the code generator can be configured to receive as input the modified data structure that includes a representation of programming code that complies with the syntactic and/or semantic constraints. In some instances, a converter (e.g., the converter 306 of FIG. 3) can convert the modified data structure to programming code, and the code generator (e.g., the code generator 114) is configured to accept the programming code as input. The sending can be performed, for example, via a RESTful interface, a command line interface, or a programmable interface. In some instances, the sending can be performed automatically (i.e., without human intervention) after the modifying at 708. The code generator can be used to generate target programming code (e.g., target code 150) that, for example, is associated with a programming language according to an indication (e.g., the target language indication 130), as described herein.

In an embodiment, a method includes receiving, via a processor, first data representing one or more coding requirements defined by a user. The method also includes receiving, via the processor, (1) an indication of one or more target computer programming languages and (2) a first machine-readable code having a first set of one or more inputs and a first set of one or more outputs, the first set of one or more inputs being substantially equivalent to a second set of one or more inputs of a target machine-readable code, and the first set of one or more outputs being substantially equivalent to a second set of one or more outputs of the target machine-readable code. The method also includes modifying the first machine-readable code to generate a second machine-readable code based, at least in part, on the first data representing the one or more coding requirements defined by the user. The method also includes generating the target machine-readable code based, at least in part, on the one or more target computer programming languages and the second machine-readable code.

In some implementations, the modifying the first machine-readable code to generate the second machine-readable code can include generating a first hierarchal data structure based, at least in part, on the first machine-readable code. The modifying can also include transforming the first hierarchal data structure to generate a second hierarchal data structure based, at least in part, on one or more declarative rules that define one or more transformations to the first hierarchal data structure based on at least one of a pattern defined by the first hierarchal data structure or a condition defined by the first hierarchal data structure. The modifying can also include generating second machine-readable code based, at least in part, on the second hierarchal data structure.

In some implementations, the first data representing the one or more coding requirements defined by a user can include one or more lexical rules that have at least one of a syntactic rule or a semantic rule.

In some implementations, the first data can be contained within one or more specification documents that include one or more rules.

In some implementations, one or more machine-readable specification documents can include the first data, the one or more machine-readable specification documents defining at least one of a lexical constraint, a structural constraint, a dependency constraint, or a file requirement constraint. The generating the target machine-readable code can include generating the target machine-readable code based, at least in part, on the one or more machine-readable specification documents.

In some implementations, the generating the target machine-readable code can include generating the target machine-readable code, at a code generator, based, at least in part, on the second machine-readable code. The second machine-readable code can be provided to the code generator by any of a RESTful interface, a command line interface, or a programmable interface.

In an embodiment, a method includes receiving, at a compute device, one or more programming design rules. The method also includes generating, via the compute device, (1) a machine-readable declarative specification including the one or more programming design rules, and (2) machine-readable code that complies with the one or more programming design rules included in the machine-readable declarative specification.

In some implementations, the machine-readable code can include at least one of an application code base, an infrastructure-as-code base, or a deployment artifact.

In some implementations, the one or more programming design rules can include at least one of a programming language-specific syntax rule, a programming language-specific semantic rule, a project structure rule, a package hierarchy rule, an interface rule, a library dependency rule, or an abstraction rule.

In some implementations, the method can include generating one or more prototype specifications that are configured to generate one or more artifacts that comply with the one or more programming design rules. The method can also include generating the one or more artifacts using the one or more prototype specifications.

In an embodiment, a non-transitory processor-readable medium stores code representing instructions to be executed by one or more processors. The instructions include code to cause the one or more processors to receive first data indicating at least one of a syntactic constraint to be applied to executable programming code or a semantic constraint to be applied to executable programming code. The instructions also include code to cause the one or more processors to receive second data configured to be used by a code generator to generate the executable programming code. The instructions also include code to cause the one or more processors to generate third data based, at least in part, on the second data, the third data indicating a syntactic structure of the second data. The instructions also include code to cause the one or more processors to generate fourth data based, at least in part, on the first data and the third data, the fourth data indicating a syntactic structure of the third data. The instructions also include code to cause the one or more processors to send the fourth data to the code generator configured to generate the executable programming code based, at least in part, on the fourth data.

In some implementations, the first data can include at least one of a constraint on memory utilization, a constraint on execution time, a constraint on time complexity, a constraint on space complexity, a constraint on cyclometric complexity, or a secure coding rule.

In some implementations, a cloud-native application can be configured to use the executable programming code.

In some implementations, the third data includes a first syntax tree, and the fourth data includes a second syntax tree.

In some implementations, the code can include code to cause the one or more processors to receive fifth data indicating at least one of a user-defined directory structure, a user-defined package hierarchy, or a user-defined library dependency. The code can also include code to cause the one or more processors to send the fifth data to the code generator configured to generate executable programming code based, at least in part, on the fifth data.

In some implementations, the code can include code to cause the one or more processors to receive fifth data configured to generate an artifact configured to comply with one or more user-defined constraints. The code can also include code to cause the one or more processors to send the fifth data to the code generator to generate the executable programming code based on the fifth data, the executable programming code including the artifact.

In some implementations, at least a portion of the executable programming code can be used to configure a network that includes two or more compute devices.

In some implementations, the code to send the fourth data to the code generator can include sending one or more machine-readable specification documents defining at least one of a lexical constraint, a structural constraint, a dependency constraint, or a file requirement constraint, to the code generator to generate the executable programming code based, at least in part, on the one or more machine-readable specification documents.

In some implementations, the semantic constraint can define a subset of a standardized programming language to be excluded by the executable programming code. The executable programming code can exclude the subset of the standardized programming language.

In some implementations, the syntactic constraint can define one or more characters to be included in a symbolic name associated with a memory location to be referenced by the executable programming code.

All combinations of the foregoing concepts and additional concepts discussed here (provided such concepts are not mutually inconsistent) are contemplated as being part of the subject matter disclosed herein. The terminology explicitly employed herein that also may appear in any disclosure incorporated by reference should be accorded a meaning most consistent with the particular concepts disclosed herein.

The skilled artisan will understand that the drawings primarily are for illustrative purposes, and are not intended to limit the scope of the subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar and/or structurally similar elements).

To address various issues and advance the art, the entirety of this application (including the Cover Page, Title, Headings, Background, Summary, Brief Description of the Drawings, Detailed Description, Embodiments, Abstract, Figures, Appendices, and otherwise) shows, by way of illustration, various embodiments in which the embodiments may be practiced. The advantages and features of the application are of a representative sample of embodiments only, and are not exhaustive and/or exclusive. Rather, they are presented to assist in understanding and teach the embodiments, and are not representative of all embodiments. As such, certain aspects of the disclosure have not been discussed herein. That alternate embodiments may not have been presented for a specific portion of the innovations or that further undescribed alternate embodiments may be available for a portion is not to be considered to exclude such alternate embodiments from the scope of the disclosure. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure.

Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure.

Various concepts may be embodied as one or more methods, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

In addition, the disclosure may include other innovations not presently described. Applicant reserves all rights in such innovations, including the right to embodiment such innovations, file additional applications, continuations, continuations-in-part, divisionals, and/or the like thereof. As such, it should be understood that advantages, embodiments, examples, functional, features, logical, operational, organizational, structural, topological, and/or other aspects of the disclosure are not to be considered limitations on the disclosure as defined by the embodiments or limitations on equivalents to the embodiments. Depending on the particular desires and/or characteristics of an individual and/or enterprise user, database configuration and/or relational model, data type, data transmission and/or network framework, syntax structure, and/or the like, various embodiments of the technology disclosed herein may be implemented in a manner that enables a great deal of flexibility and customization as described herein.

All definitions, as defined and used herein, should be understood to control over dictionary definitions, definitions in documents incorporated by reference, and/or ordinary meanings of the defined terms.

As used herein, in particular embodiments and unless stated otherwise, the terms "about" "substantially" or "approximately" when preceding a numerical value indicates the value plus or minus a range of 10%. Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

The indefinite articles "a" and "an," as used herein in the specification and in the embodiments, unless clearly indicated to the contrary, should be understood to mean "at least one."

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

Some embodiments and/or methods described herein can be performed by software (executed on hardware), hardware, or a combination thereof. Hardware modules may include, for example, a processor, a field programmable gate array (FPGA), and/or an application specific integrated circuit (ASIC). Software modules (executed on hardware) can include instructions stored in a memory that is operably coupled to a processor, and can be expressed in a variety of software languages (e.g., computer code), including C, C++, Java™, Ruby, Visual Basic™ and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

The term "processor" should be interpreted broadly to encompass a general purpose processor, a central processing unit (CPU), a microprocessor, a digital signal processor (DSP), a controller, a microcontroller, a state machine and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may comprise a single computer-readable statement or many computer-readable statements.

While specific embodiments of the present disclosure have been outlined above, many alternatives, modifications, and variations will be apparent to those skilled in the art. Accordingly, the embodiments set forth herein are intended to be illustrative, not limiting. Various changes may be made without departing from the spirit and scope of the disclosure.

The invention claimed is:

1. A method, comprising:
receiving, via a processor, first data representing one or more coding requirements defined by a user;
receiving, via the processor, an indication of one or more target computer programming languages;
receiving, via the processor, a first machine-readable code configured to (1) accept and operate on a first set of one or more inputs and (2) operate to produce a first set of one or more outputs, the first set of one or more inputs being substantially equivalent to a second set of one or more inputs of a target machine-readable code, and the first set of one or more outputs being substantially equivalent to a second set of one or more outputs of the target machine-readable code;
generating a first hierarchal data structure based, at least in part, on the first machine-readable code;
transforming the first hierarchal data structure to generate a second hierarchical data structure based, at least in part, on the first data representing the one or more coding requirements defined by the user;
generating the second machine-readable code based, at least in part, on the second hierarchal data structure; and
generating the target machine-readable code based, at least in part, on the one or more target computer programming languages and the second machine-readable code.

2. The method of claim 1, wherein the transforming the first hierarchal data structure to generate the second hierarchal data structure
is based, at least in part, on one or more declarative rules that define one or more transformations to the first hierarchal data structure based on at least one of a pattern defined by the first hierarchal data structure or a condition defined by the first hierarchal data structure.

3. The method of claim 1, wherein the first data representing the one or more coding requirements defined by the user includes one or more lexical rules that have at least one of a syntactic rule or a semantic rule.

4. The method of claim 1, wherein the first data is contained within one or more specification documents that include one or more rules.

5. The method of claim 1, wherein:
one or more machine-readable specification documents includes the first data, the one or more machine-readable specification documents defining at least one of (1) a lexical constraint, (2) a structural constraint associated with at least one of a folder structure, a package structure, or a backing service, (3) a dependency constraint associated with at least one of streaming log aggregation, open telemetry, or security, or (5) a prototype file constraint associated with an artifact; and the generating the target machine-readable code includes generating the target machine-readable code based, at least in part, on the one or more machine-readable specification documents.

6. The method of claim 1, wherein:
the generating the target machine-readable code includes generating the target machine-readable code, at a code generator, based, at least in part, on the second machine-readable code; and
the second machine-readable code is provided to the code generator by any of a RESTful interface, a command line interface, or a programmable interface.

7. A method, comprising:
receiving, at a compute device, one or more programming design rules;
receiving, at the compute device, a first machine-readable code configured to (1) accept and operate on a first set of one or more inputs and (2) operate to produce a first set of one or more outputs, the first set of one or more inputs being substantially equivalent to a second set of one or more inputs of a second machine-readable code, and the first set of one or more outputs being substantially equivalent to a second set of one or more outputs of the second machine-readable code;
generating, via the compute device, a machine-readable declarative specification including the one or more programming design rules;
generating a first hierarchal data structure based, at least in part, on the first machine-readable code;
transforming the first hierarchal data structure to generate a second hierarchical data structure based, at least in part, on the programming design rules; and
generating, via the compute device and based at least in part on the second hierarchical data structure, the second machine-readable code that complies with the one or more programming design rules included in the machine-readable declarative specification.

8. The method of claim 7, wherein:
the second machine-readable code includes at least one of an application code base, an infrastructure-as-code base, or a deployment artifact.

9. The method of claim 7, wherein:
the one or more programming design rules includes at least one of a programming language-specific syntax rule, a programming language-specific semantic rule, a project structure rule, a package hierarchy rule, an interface rule, a library dependency rule, or an abstraction rule.

10. The method of claim 7, further comprising:
generating one or more prototype specifications configured to generate one or more artifacts that comply with the one or more programming design rules; and
generating the one or more artifacts using the one or more prototype specifications.

11. A non-transitory processor-readable medium storing code representing instructions to be executed by one or more processors, the instructions comprising code to cause the one or more processors to:
receive first data indicating at least one of a syntactic constraint to be applied to executable programming code or a semantic constraint to be applied to the executable programming code;
receive second data configured to be used by a code generator to generate the executable programming code, the second data configured to (1) accept and operate on at least one input that is substantially equivalent to at least one input of the executable programming code and (2) operate to produce at least one output that is substantially equivalent to at least one output of the executable programming code;

generate third data based, at least in part, on the second data, the third data indicating a syntactic structure of the second data;

transform fourth data based, at least in part, on the first data and the third data, the fourth data indicating a syntactic structure of the third data; and send the fourth data to the code generator configured to generate the executable programming code based, at least in part, on the fourth data.

12. The non-transitory processor-readable medium of claim 11, wherein the first data includes at least one of a constraint on memory utilization, a constraint on execution time, a constraint on time complexity, a constraint on space complexity, or a constraint on cyclometric complexity.

13. The non-transitory processor-readable medium of claim 11, wherein a cloud-native application is to use the executable programming code.

14. The non-transitory processor-readable medium of claim 11, wherein:

the third data includes a first syntax tree; and the fourth data includes a second syntax tree.

15. The non-transitory processor-readable medium of claim 11, wherein the code further comprises code to cause the one or more processors to:

receive fifth data indicating at least one of a user-defined directory structure, a user-defined package hierarchy, or a user-defined library dependency; and send the fifth data to the code generator configured to generate the executable programming code based, at least in part, on the fifth data.

16. The non-transitory processor-readable medium of claim 11, wherein the code further comprises code to cause the one or more processors to:

receive fifth data configured to generate an artifact configured to comply with one or more user-defined constraints; and send the fifth data to the code generator to generate the executable programming code based on the fifth data, the executable programming code including the artifact.

17. The non-transitory processor-readable medium of claim 11, wherein at least a portion of the executable programming code is to be used to configure a network including two or more compute devices.

18. The non-transitory processor-readable medium of claim 11, wherein the code to send the fourth data to the code generator includes:

sending one or more machine-readable specification documents defining at least one of (1) a lexical constraint, (2) a structural constraint associated with at least one of a folder structure, a package structure, or a backing service, (3) a dependency constraint associated with at least one of streaming log aggregation, open telemetry, or security, or (5) a prototype file constraint associated with an artifact, to the code generator to generate the executable programming code based, at least in part, on the one or more machine-readable specification documents.

19. The non-transitory processor-readable medium of claim 11, wherein:

the semantic constraint defines a subset of a standardized programming language to be excluded by the executable programming code; and the executable programming code excludes the subset of the standardized programming language.

20. The non-transitory processor-readable medium of claim 11, wherein:

the syntactic constraint defines one or more characters to be included in a symbolic name associated with a memory location to be referenced by the executable programming code.

* * * * *

UNITED STATES PATENT AND TRADEMARK OFFICE
CERTIFICATE OF CORRECTION

| | |
|---|---|
| PATENT NO. | : 12,020,004 B1 |
| APPLICATION NO. | : 18/446238 |
| DATED | : June 25, 2024 |
| INVENTOR(S) | : Dipanjan Sengupta et al. |

It is certified that error appears in the above-identified patent and that said Letters Patent is hereby corrected as shown below:

In the Specification

Column 4, Line 17: "Java, NET, PUP, Ruby, Ruby on Rails, ASP.NET, C#, F#," should read
--Java, .NET, PHP, Ruby, Ruby on Rails, ASP.NET, C#, F#,--

Signed and Sealed this
Sixth Day of August, 2024

Katherine Kelly Vidal
*Director of the United States Patent and Trademark Office*